Aug. 24, 1943.　　　R. S. HOPKINS　　　2,327,790

CAMERA BELLOWS AND METHOD OF MAKING SAME

Filed Sept. 23, 1941　　　2 Sheets-Sheet 1

ROY S. HOPKINS
INVENTOR

BY

ATTORNEYS

Aug. 24, 1943.   R. S. HOPKINS   2,327,790
CAMERA BELLOWS AND METHOD OF MAKING SAME
Filed Sept. 23, 1941   2 Sheets-Sheet 2
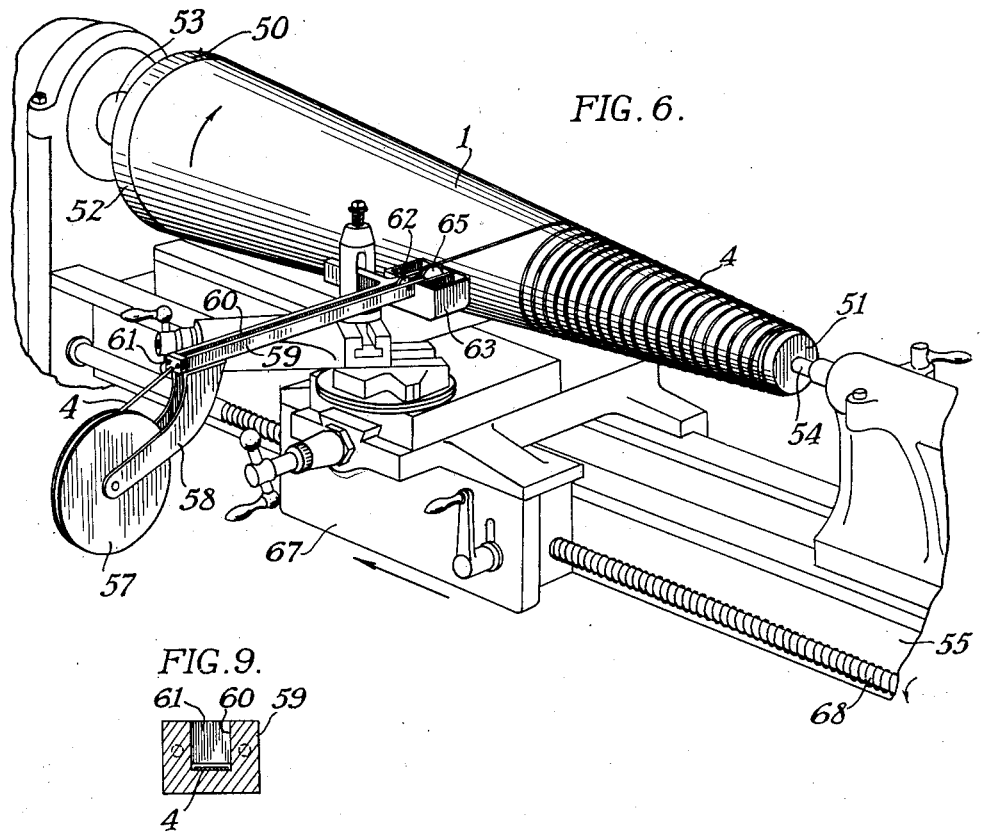
FIG. 6.
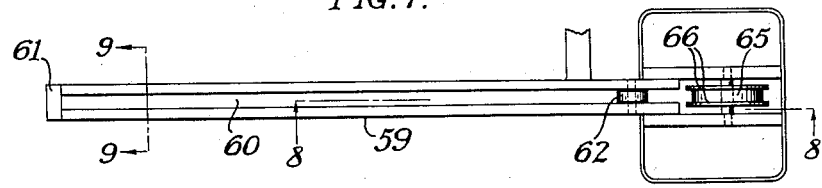
FIG. 9.
FIG. 7.
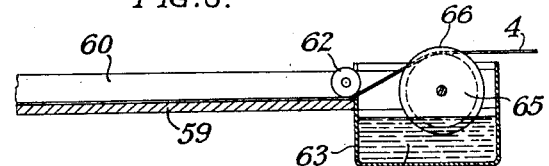
FIG. 8.
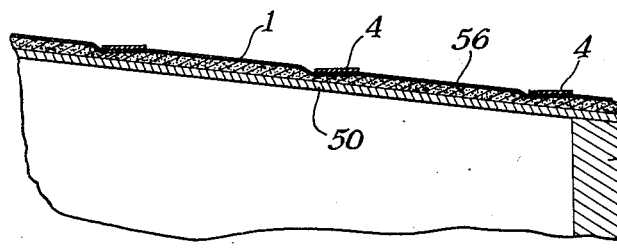
FIG. 10.
ROY S. HOPKINS
INVENTOR
BY
ATTORNEYS Patented Aug. 24, 1943

2,327,790

UNITED STATES PATENT OFFICE 2,327,790

CAMERA BELLOWS AND METHOD OF MAKING SAME

Roy S. Hopkins, Rochester, N. Y., assignor to Eastman Kodak Company, Rochester, N. Y., a corporation of New Jersey Application September 23, 1941, Serial No. 411,999

10 Claims. (Cl. 95—39)

This invention relates to a camera bellows and a method of making the same. One object of my invention is to provide a bellows which is simple in construction and inexpensive to manufacture. Another object of my invention is to provide a bellows which is extremely flexible and which can readily be made in unusually long lengths if desired. A further object of my invention is to provide a bellows which is attractive in appearance. A still further object is to provide a bellows with a metal band so shaped as to cause the bellows to fold smoothly with a metal band outside and the fabric of the bellows inside. Other objects will appear from the following specification, the novel features being particularly pointed out in the claims at the end thereof.

It has been customary in the past to make camera bellows rectangular in shape and provided with a plurality of folds in the material which is usually laminated so that the bellows may fold. A great many bellows are made with an inside lining, reinforcing fold strips mounted on the lining and an exterior cover of real or artificial leather. Such bellows are usually folded by hand, particularly in the large sizes so that the bellows has normally been quite an expensive item in most cameras and particularly in enlargers where it is frequently necessary to use extremely long bellows from four to six feet.

In accordance with my invention, I have provided an extremely inexpensive bellows and one which can be quickly and easily made which will fold extremely flat.

Coming now to the drawings wherein like reference characters denote like parts throughout:

Fig. 6 is a perspective view illustrating one of the steps of manufacturing the bellows shown in Fig. 1;

Fig. 7 is a top plan view of a fixture used for applying a metallic strip to the outside of the bellows;

Fig. 8 is a section taken on line 8—8 of Fig. 7;

Fig. 9 is a section taken on line 9—9 of Fig. 7; and

Fig. 10 is an enlarged fragmentary detail view in section showing a portion of the bellows supporting structure used in manufacturing bellows.

In order to eliminate the usual expense in connection with the manufacturing of camera bellows and in order to make a light weight, extremely flexible bellows, I have provided a bellows preferably made from a single layer of thin light-tight fabric material such as the rubberized fabric frequently used for making the focal plane shutters of cameras. Over a truncated cone of this type of material, I have wound a spiral spring of flat stock which serves both to support the bellows and to permit it to collapse or fold.

Where I refer herein to a camera bellows, I mean to include in this term a bellows for any photographic purpose, such as for cameras, for enlarging cameras, for camera hoods and other purposes in which such bellows are commonly used. In order to illustrate a particularly suitable machine for utilizing my improved bellows, reference may be had to my Patent 1,623,538, granted April 5, 1927, for an automatically focusing camera used primarily for making enlargements and reductions, although of course the machine may also be used for making 1—1 projection prints. In such machines a bellows is used between a negative carrier and a lens board and, for machines which will produce a large degree of magnification, this bellows must be quite long. For instance, I have found that such a machine might require a bellows of approximately 5 feet long and yet it is desirable to keep the bellows of light weight and to retain unusual flexibility so that the projecting camera may be readily moved for various different magnifications.

Figure 1:
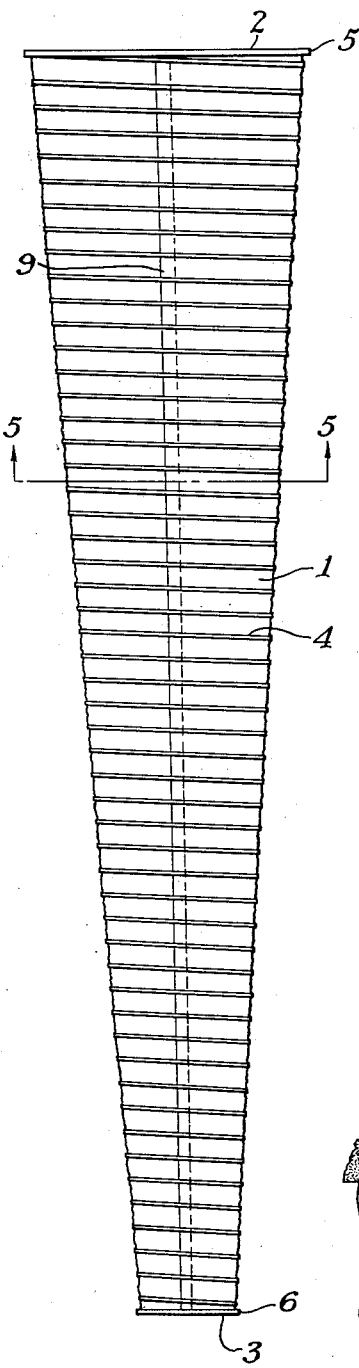
Fig. 1 is a side elevation of a camera bellows constructed in accordance with and embodying a preferred form of my invention.

Referring to Fig. 1, the bellows may consist of a thin, flexible, truncated cone member 1 which may be of greater diameter at one end 2 than it is at the other end 3. As above explained, this truncated cone may be of rubberized fabric which is light-proof, and I provide a foldable support for the bellows which consists of a thin metal band 4, preferably made of a clock spring-like material, which is wound in the form of a helix and which is fastened to the bellows material 1.

Figure 3:
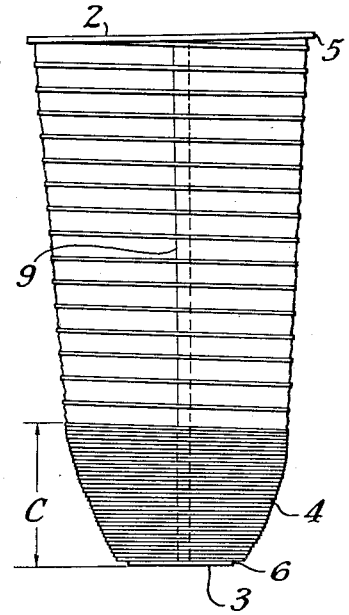
Fig. 3 is a view similar to Fig. 1, but with the camera bellows in a partially folded position.
Figure 2:
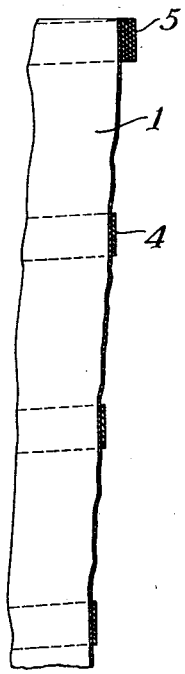
Fig. 2 is an enlarged fragmentary sectional view through the wall of the bellows shown in Fig. 1.
Figure 5:
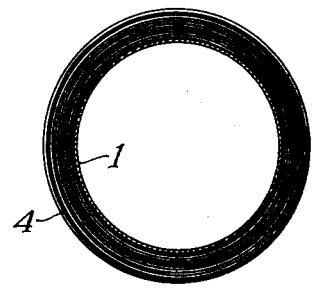
Fig. 5 is a section taken on line 5—5 of Fig. 1.

The upper edge of the bellows may consist of a plurality of convolutions 5 of the band material wound one layer on the other and fastened together, and at the lower edge 6 the band material may be similarly wound to provide a reinforced end on the bellows which may be attached to the necessary parts of a camera in any known manner. As indicated in Fig. 3, if the bellows 1 is partially collapsed, it will collapse from the bottom up so that the collapsed portion of the bellows indicated at C will presently only the outside edge of the metal band 4. This makes an attractive type of fold because the metal band 4 may be suitably lacquered, polished or plated so that the contrasting color of the metal band and bellows material will make an attractive appearance. I have found, for instance, that by chromium plating the band 4 and by using a dead black fabric material 1, an extremely striking bellows can be produced.

Figure 4:
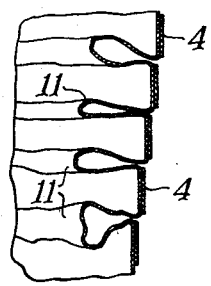
Fig. 4 is an enlarged fragmentary sectional view through a portion of a bellows folded as in the lower part of Fig. 3.

If the bellows is extremely long and it is not necessary any time to bring the upper edge 2 close to the lower edge 3, the fold shown in Fig. 3 can be used, this fold being shown in greater detail in Fig. 4. From this figure it will appear that the bellows material 1 folds rearwardly from the band material 4 into a series of irregular loops 11. In this instance, the diameter of each successive convolution of the band material 4 is not quite small enough to permit the bands 4 to telescope so that the fold of convolutions present the material indicated at 4 in Fig. 3 with only the metal bands showing. However, if it is necessary to provide a still more compact bellows, the modification of my invention shown in Fig. 4a may be used wherein the band material 40 is wound so that each successive convolution is enough smaller than the convolution above it to permit the band material 40 to fold until the bands will all lie in substantially the same plane. In this case the bellows material folds upwardly into a series of convolutions 41 as each successive convolution of the metal band 40 is lowered until it reaches a supporting surface 42.

I have devised a method for making the above-described bellows which makes it very inexpensive. Referring to Fig. 6, I prefer to provide a truncated cone-shaped support 50, small at one end 51 and large at the other end 52, and this support is adapted to be positioned between a suitable chuck 53 and center 54 of a standard type of lathe 55. As indicated in Fig. 10, over the top of the truncated support 50 I place a flexible pad 56 which may be made of fabric or felt. Before placing the form in the lathe, a sheet of fabric 1 is stretched around the form and, as indicated in Fig. 3, the edges of the sheet are overlapped as at 9 and are fastened with a suitable cement, such a cement being sold on the market and being known as "Vulcolox." After the fabric has been stretched over the felt pad 56 and the form 50 has been placed in a lathe, the metal band 4 is rapidly wound and cemented in place in the following manner. A coil of the strip material 4 is carried by a spool 57 supported on a bracket 58 carried by an arm 59, this arm, as better shown in Figs. 7 and 8, including two side rails 60, an end rail 61 and a roller guide 62 trunnioned in the rails 59 at one end. A small tank 63 carries a suitable cement 64, such as the cement above mentioned, and an applicator roll 65 supplies cement to the underside of the metal band 1 as it passes between the spaced flanges 66 of the spool 65.

This applicator is attached by any suitable means to a carriage 67 of the lathe 55 having an automatic feed screw 68 for moving the carriage longitudinally of the lathe. After placing the carriage at one end of the form 50, for instance at the small end 51, and after feeding one or more convolutions of the band material to form the end 3 of the bellows, the drive for the lathe may be started so that the band material 4 may be fed throughout the length of the form automatically. As the band is wound on the bellows material 1, the flexible material 56 permits the band to lie substantially parallel to the axis of the form 50 in the manner shown by Fig. 10. This comprises small areas of the flexible material 56 so that it holds the cemented surface of the bands 4 firmly in contact with the bellows material so that these parts will properly adhere.

Figure 4A:
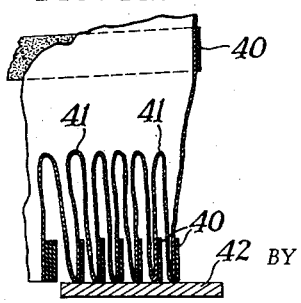
Fig. 4a is a view similar to Fig. 4, but with the bellows folded into a different position, this figure illustrating a slightly different embodiment of my invention.

After the large end of the form is reached, the automatic feed through screw 68 may be cut out and one or more convolutions of the spring may be wound at the upper edge 2 of the bellows to form the reinforced supporting band 5. After positioning the supporting band member on the bellows material, the adhesive is allowed to set and the end of the band material is cut off. The bellows may then be drawn over the small end 51 of the form and is ready to be placed on a camera. These operations can be very quickly and easily performed with relatively unskilled help. No preliminary folding of the bellows is necessary because the band material is made of spring material preferably of spring steel so that it naturally tends to coil up or fold the material when the bellows ends 2 and 3 are brought together. Since the bellows is preferably of a truncated cone-shaped form, the material tends to fold as indicated at Figs. 4 or 4a according to the size or diameter of the successive convolutions of the spiral supporting strip 40. Thus, not only are the usual operations of making each bellows fold eliminated, but the bellows can be made very much lighter than the more normal type of bellows, even including the weight of the supporting spring.

What I claim as new and desire to secure by Letters Patent of the United States is:

1. A camera bellows comprising a truncated cone-shaped flexible member, and a support therefor comprising a spiral-shaped spring metal band firmly attached to the outside of the flexible member throughout its length whereby said bellows may fold as the convolutions of the spiral spring member may approach adjacent convolutions.

2. A camera bellows comprising a truncated cone-shaped flexible member of lightproof material, and a spiral flat spring member extending around the outside thereof, the flat surface of the spring member engaging and being attached to the flexible lightproof member.

3. A camera bellows comprising a truncated cone-shaped flexible member of lightproof material, and a spiral flat spring member extending around the outside thereof, the flat surface of the spring member engaging and being attached to the flexible lightproof member, the ends of the flat spring member including more than one convolution positioned to encircle the end of the bellows to form a supporting ring therefor, said supporting ring also being attached to the bellows.

4. A decorative camera bellows comprising a lightproof fabric truncated cone-shaped member, a flat polished metal band coiled in a spiral about the fabric member, said metal band and fabric being firmly attached throughout their length.

5. A camera bellows comprising a truncated cone-shaped flexible member impervious to light, a flat metal flexible helix attached to the flexible member, throughout its length, and adapted to fold as the convolutions approach each other, the flexible member folding inwardly between convolutions of the metal member, and ring-shaped supports for the flexible truncated cone-shaped member attached to the ends thereof.

6. A camera bellows comprising a flexible light-proof fabric sleeve, and a metal band attached thereto, said metal band being shaped to form a spiral support for the bellows between the ends thereof and including ring-shaped convolutions at each end thereof.

7. A method of making a camera bellows comprising mounting a truncated cone-shaped flexible sleeve on a similar shaped support having a resilient surface, winding and attaching a flat spring metal band in a spiral upon said flexible sleeve, and removing the sleeve and attached metal band from said support.

8. A method of making a camera bellows comprising mounting a truncated cone-shaped flexible sleeve on a similar shaped support having a resilient surface, applying an adhesive material to a spring metal band, winding the adhesively coated spring metal band into contact with the flexible sleeve and into the form of a spiral extending from one end of the flexible sleeve to the other.

9. A method of making a camera bellows comprising mounting a truncated cone-shaped flexible sleeve on a similar shaped support having a resilient surface, applying an adhesive material to a spring metal band, winding the adhesively coated spring metal band into contact with the flexible sleeve and into the form of a spiral extending from one end of the flexible sleeve to the other, and winding additional convolutions of the spring metal band to form reinforcing rings at each end of the sleeve.

10. A method of making a camera bellows comprising drawing a sleeve of lightproof bellows fabric over a truncated cone-shaped support with a resilient covering, winding at least one convolution of flat spring material at the end of the sleeve forming an end bellows supporting ring, winding the flat spring material along the length of the bellows with spaced spiral convolutions, and finally winding at least one convolution of said flat spring material at the opposite end of the sleeve to form a second bellows supporting ring, and applying an adhesive to the flat spring material before applying it to the sleeve of lightproof material with sufficient pressure to cause it to firmly adhere thereto.

ROY S. HOPKINS.